(12) United States Patent
Appenzeller et al.

(10) Patent No.: US 7,685,414 B1
(45) Date of Patent: Mar. 23, 2010

(54) SUBSCRIPTION MANAGEMENT SERVICE FOR SECURE MESSAGING SYSTEM

(75) Inventors: Guido Appenzeller, Menlo Park, CA (US); Terence Spies, San Mateo, CA (US)

(73) Assignee: Voltage Security, Inc., Palo Alto, CA (US)

( * ) Notice: Subject to any disclaimer, the term of this patent is extended or adjusted under 35 U.S.C. 154(b) by 636 days.

(21) Appl. No.: 10/927,892

(22) Filed: Aug. 27, 2004

(51) Int. Cl.
 *H04L 9/00* (2006.01)
 *H04L 9/30* (2006.01)
(52) U.S. Cl. ...................... 713/150; 380/282
(58) Field of Classification Search ........................ None
 See application file for complete search history.

(56) References Cited

U.S. PATENT DOCUMENTS

| | | | |
|---|---|---|---|
| 4,206,315 A | | 6/1980 | Matyas et al. |
| 4,405,829 A | | 9/1983 | Rivest et al. |
| 4,868,877 A | | 9/1989 | Fischer |
| 5,677,955 A | * | 10/1997 | Doggett et al. ............ 705/76 |
| 5,903,880 A | * | 5/1999 | Biffar ........................ 705/39 |
| 6,192,407 B1 | | 2/2001 | Smith et al. |
| 6,675,153 B1 | * | 1/2004 | Cook et al. ................ 705/74 |
| 6,684,336 B1 | * | 1/2004 | Banks et al. ............. 709/227 |
| 6,732,101 B1 | * | 5/2004 | Cook ......................... 707/10 |
| 7,089,208 B1 | * | 8/2006 | Levchin et al. ............ 705/39 |
| 7,191,151 B1 | * | 3/2007 | Nosek ........................ 705/39 |
| 7,266,847 B2 | * | 9/2007 | Pauker et al. .............. 726/27 |
| 7,321,660 B2 | * | 1/2008 | Mont et al. ............... 380/277 |
| 2002/0136410 A1 | * | 9/2002 | Hanna ........................ 380/277 |
| 2004/0019779 A1 | * | 1/2004 | Harrison et al. .......... 713/150 |
| 2004/0165728 A1 | * | 8/2004 | Crane et al. .............. 380/279 |
| 2004/0230540 A1 | * | 11/2004 | Crane et al. ................ 705/76 |
| 2005/0002528 A1 | * | 1/2005 | Chen et al. ................ 380/255 |
| 2005/0039031 A1 | * | 2/2005 | Mont et al. ............... 713/189 |
| 2005/0071632 A1 | * | 3/2005 | Pauker et al. ............. 713/165 |
| 2008/0049937 A1 | * | 2/2008 | Pauker et al. ............. 380/270 |

OTHER PUBLICATIONS

Boneh, Dan et al., "Identity-Based Encryption from the Weil Pairing", 2003, SIAM Journal of Computing, vol. 32, No. 3, pp. 1-31.*

* cited by examiner

*Primary Examiner*—Matthew B Smithers
*Assistant Examiner*—Jeffery Williams
(74) *Attorney, Agent, or Firm*—Treyz Law Group; G. Victor Treyz; David C. Kellogg

(57) ABSTRACT

Systems and methods for secure messaging are provided. A sender may encrypt an email message for a recipient. The email message may contain authenticated sender-recipient mapping information. When a recipient requests a client software download or private key from a service provider, the service provider can verify the authenticity of the sender-recipient mapping information. This assures the service provider that the recipient has received a communication from the sender and allows the service provider to provide services to the recipient based on the status of the sender. If the sender is a member of an organization that is a direct customer of the service provider, the service provider may satisfy the recipient's service request.

6 Claims, 9 Drawing Sheets

| USER ID | CUSTOMER ID | STATUS |
|---|---|---|
| USER1@XYZCORP.COM | ABC FIRM | SECONDARY |
| USER2@ABCFIRM.COM | ABC FIRM | PRIMARY |
| USER3@QRSCORP.COM | QRS INC. | TERTIARY-EXPIRED |
| USER4@QRSCORP.COM | QRS INC. | TERTIARY EXPIRES 3/12/04 |
| USER5@QRSCORP.COM | QRS INC. | SUSPENDED |
| RECIPIENT1@COMPANYW.COM | COMPANY W INC. | PRIMARY |

FIG. 6

| DOMAIN NAME | CUSTOMER ID |
|---|---|
| QRSCORP.COM | QRS INC. |
| QRSPARTS.COM | QRS INC. |
| COMPANYW.COM | COMPANY W INC. |

FIG. 7

| SENDER | RECIPIENT |
|---|---|
| USER6@XYZCORP.COM | USER7@ABCCORP.COM |
| USER7@ABCCORP.COM | USER9@QRSCORP.COM |
| USER10@XYZCORP.COM | USER11@ABCCORP.COM |

FIG. 8

SUBSCRIPTION MANAGEMENT SERVICE FOR SECURE MESSAGING SYSTEM

BACKGROUND OF THE INVENTION

This invention relates to cryptographic systems, and more particularly, to subscription management services for secure messaging systems.

It is often desirable to encrypt sensitive electronic communications such as email messages. With symmetric key cryptographic arrangements, the sender of a message uses the same key to encrypt the message that the recipient of the message uses to decrypt the message. Symmetric key systems require that each sender and recipient exchange a shared key in a secure manner.

With public key cryptographic systems, two types of keys are used—public keys and private keys. Senders may encrypt messages using the public keys of recipients. Each recipient has a private key that is used to decrypt the messages for that recipient.

To ensure the authenticity of the public keys in traditional public key systems and thereby defeat possible man-in-the-middle attacks, public keys may be provided to senders with a certificate signed by a trusted certificate authority. The certificate may be used to verify that the public key belongs to the intended recipient of the sender's message. Public key encryption systems that use this type of traditional approach are said to use the public key infrastructure (PKI) and are referred to as PKI cryptographic systems.

Identity-based-encryption (IBE) public key cryptographic systems have also been proposed. As with PKI cryptographic systems, a sender in an IBE system may encrypt a message for a given recipient using the recipient's public key. The recipient may then decrypt the message using the recipient's corresponding private key. The recipient can obtain the private key from a private key generator associated with the recipient.

Unlike PKI schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

The operation of a cryptographic system requires ongoing maintenance. In some situations, the responsibility for the operation of a cryptographic system may rest with a single organization. The organization can perform setup operations such as the distribution and installation of encryption and decryption software. During operation of the system, the organization may use a key server to distribute keys to authorized users within the organization. This type of arrangement may work satisfactorily for closed environments in which all communications take place between users within the organization.

However, in more open environments users are not all associated with the same organization. A sender associated with one organization may desire to send an encrypted email to a recipient in another organization who in turn desires to forward the message to a recipient in a different organization. Issues such as software installation, key distribution, billing, and support need to be addressed if secure communications are to be successful in this type of environment.

SUMMARY OF THE INVENTION

The present invention relates to systems and methods for supporting secure messaging. The invention also relates to enrollment operations, billing operations, and other subscription management functions for secure messaging systems.

Messages such as email messages may be encrypted and decrypted using client software installed on users computers. The client software may include an encryption engine for encrypting email messages. Encryption may be performed using PKI or IBE encryption algorithms. The client software may also include a decryption engine for decrypting the encrypted email messages.

A service provider may perform functions such as providing downloads of the client software or providing private keys for decryption. Customers who have subscribed to the services of the service provider can be provided with services such as client software downloads and private keys. Under certain circumstances, the recipients of email messages from a customer of the service provider may also be provided with these services, even if they are not customers of the service provider themselves.

In a typical scenario, a sender may send an encrypted email message to a recipient over the Internet. When the recipient receives the encrypted email, the recipient generates a service request. The service request asks a service provider to provide the recipient with a copy of the client software and/or a copy of the recipient's private key. If the recipient is authorized, the service provider can provide the client software to the recipient over the Internet or can use a private key service to provide the recipient with the recipient's private key. The private key may be used by the decryption engine in the client software to decrypt the encrypted email for the recipient.

The service provider may have a subscription management service. The subscription management service may be used to determine whether a given recipient who has provided a service request to the service provider is authorized to have that request satisfied. If, for example, the recipient has received an email from a sender who is a member of an organization that is a direct customer of the service provider, the recipient may be provided with the requested service even if the recipient is not a member of an organization that is a customer. The subscription management service can handle enrollment operations and billing operations. Additional functions, such as data mining operations for fraud detection and prevention, may also be performed by the subscription management service or other services at the service provider.

To ensure that only properly authorized recipients obtain services from the service provider, the client software used at each sender can automatically create sender-recipient mapping information that relates the recipient to the sender. The sender-recipient mapping information can be authenticated (e.g., by digitally signing the sender-recipient mapping information at the sender or by using a hash function or other arrangement for securing this information). When the recipient sends a service request to the service provider, the recipient can provide the authenticated sender-recipient mapping information to the service provider. The service provider can verify the authenticity of the sender-recipient mapping information (e.g., by verifying its digital signature or hash function information). Once this information has been verified, the service provider can be assured that the recipient received a communication from the sender. The service provider can provide appropriate services to the recipient based on this knowledge.

Further features of the invention, its nature and various advantages will be more apparent from the accompanying drawings and the following detailed description of the preferred embodiments.

BRIEF DESCRIPTION OF THE DRAWINGS

FIG. 6 is an illustrative user status list in accordance with the present invention.

FIG. 7 is an illustrative list of primary attributes in accordance with the present invention.

FIG. 8 is an illustrative list of senders and associated recipients of messages in accordance with the present invention.

DETAILED DESCRIPTION OF THE PREFERRED EMBODIMENTS

The present invention relates to cryptographic systems such as systems for supporting secure messaging. The invention also relates to systems and methods for service providers to perform system management and control functions such as those involved in subscription management, enrollment, and billing operations.

Figure 1:
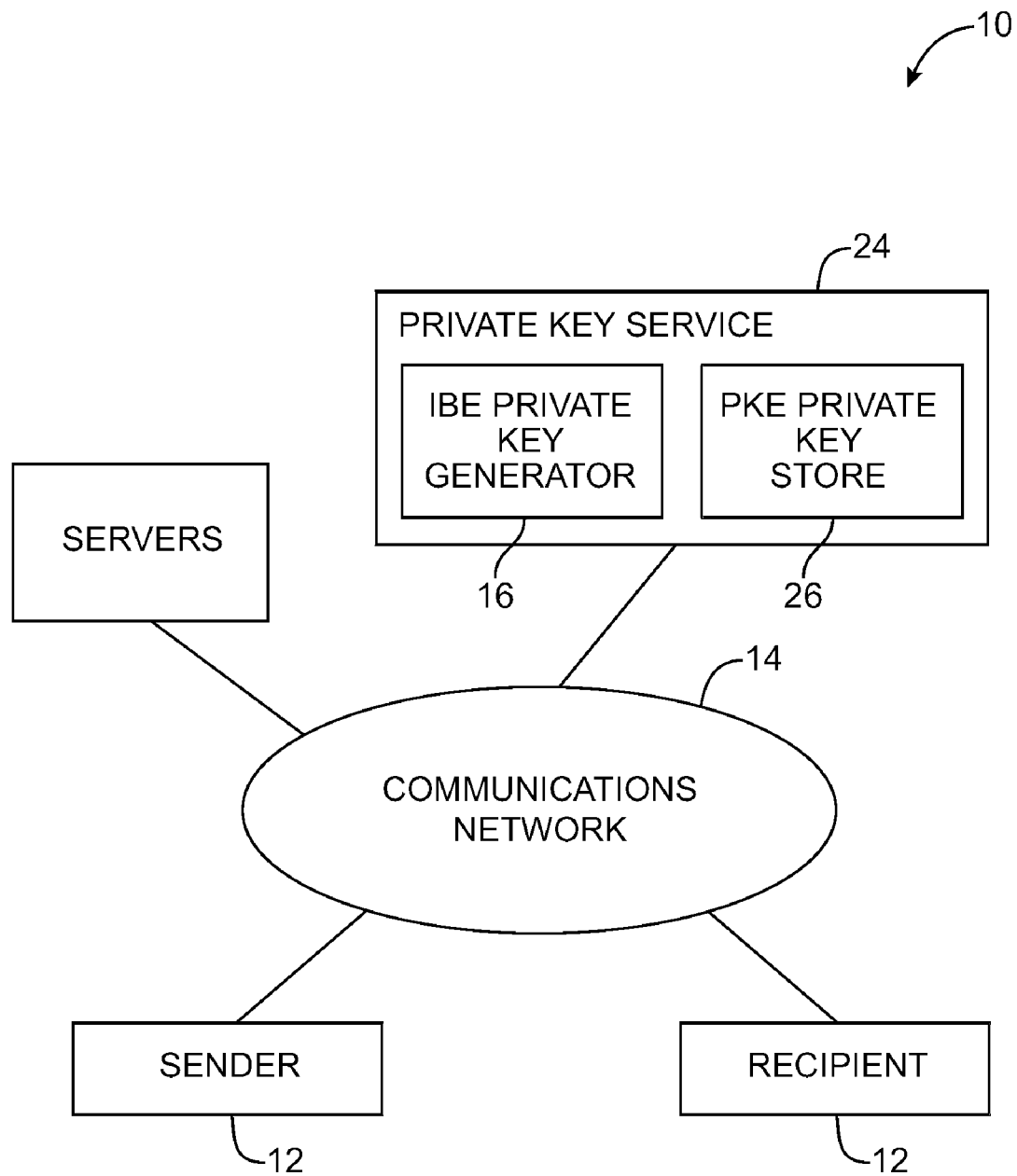
FIG. 1 is a diagram of an illustrative system in which messages may be encrypted and decrypted in accordance with the present invention.

Equipment of the type shown in FIG. 1 may be used to support secure messaging. A user in system 10 may send a secure message to one or more other users over a communications network 14. A sender is a user who sends a message. A recipient is a user who receives a message.

The messages that are carried by the system need not be email messages, although email messages are used as an example. The messages may be email messages, instant messages, or any other suitable electronically-conveyed message. Messages may include any digital information (e.g., text, graphics, audio, video, commands, executable code, data, etc.) that it is desired to convey electronically between senders and recipients.

Users may communicate with each other using equipment 12. Equipment 12 (and the equipment for the other entities in the system) may, for example, include computing equipment such as a personal computers, portable computers, workstations, mainframe computers, networked computers or terminals such as computer terminals that are connected to the Internet using a host computer in a local area network, handheld computers, or any other suitable electronic equipment.

The equipment of FIG. 1 may be interconnected by communications paths in communications network 14. Network 14 may include the Internet and other wide area networks, one or more local area networks, switched telephone networks, networks such as virtual private networks, networks including dedicated leased lines, networks based on wired or wireless paths, or any other networks formed using any other suitable network technology.

The operation of system 10 may involve the use of traditional public-key cryptographic techniques such as those used with RSA public-key cryptography. For example, a sender may use the RSA algorithm or other traditional public key encryption algorithm to encrypt a message for a recipient, using the recipient's public key. The recipient's public key may be obtained over communications network 14. A certificate from a trusted certificate authority may be used to ensure the authenticity of the public key. Digital signatures can also be implemented using traditional public-key-encryption techniques. These traditional public key cryptographic techniques use the so-called "public key infrastructure" and are referred to herein as "PKI" cryptographic techniques.

The operation of system 10 may also involve the use of identity-based-encryption (IBE) cryptographic techniques. These cryptographic techniques are referred to herein as "IBE" or "IB" cryptographic techniques. IB cryptography may be used for encryption and decryption operations and for digital signatures.

PKI and IBE encryption schemes use an asymmetric approach. Some information (so-called public key information) is used to encrypt data. Other corresponding information (so-called private key information) is used to decrypt the encrypted data.

One or more services such as private key service 24 may be used to provide private keys. A private key service may include one or more IBE private key generators such as IBE private key generator 16 for generating IBE private keys. PKI private keys may be generated using one or more PKI private key generators. After private keys are generated, they may be stored in a PKE private key store such as PKE private key store 26 at key service 24. If desired, service 24 may include a PKI private key generator.

Messages may be encrypted at a sender using an encryption engine. Encrypted messages may be decrypted at a recipient using a decryption engine. The encryption engine and decryption engine may use IBE and/or PKE encryption algorithms to encrypt and decrypt message content.

In one suitable scenario, user have software applications ("client software") such as email applications, email applications with web browser engines (i.e., built-in web browser capabilities), web browser applications, document creation and editing applications, image viewers, media players, etc. The functions of the encryption and decryption engines may be provided using stand-alone encryption and decryption applications or using encryption and decryption software components that are integrated with these applications. As an example, an email program such as an email program used by a sender may have an encryption engine. The encryption engine may be provided as part of the native code in the email application or may be installed as a plug-in module. As another example, a recipient may have a decryption engine that is built into the recipient's email application (and other applications) or may be provided as a separate software component.

Various computing devices may be used in system 10. For example, computing equipment may be used to implement the functions of a server or other computer equipment at each IBE private key generator 16, at each PKI private key store 26, etc. Servers 30 may also be used to support the functions of an IBE public parameter directory, an IBE public parameter host, a PKI public key database, a certificate authority, mail servers, and other entities. Such servers may be co-located with a sender or sender's organization, may be connected to the network 14 as an independent third-party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is sometimes referred to as a "server" or "servers" for clarity. Services in system 10 (e.g., service 24 of FIG. 1) may be implemented using software running on servers or any other suitable computing equipment.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic message may be sent. For clarity, the present invention is generally described in the context of email messages. This is merely illustrative. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient. Other user activities in system 10 may be entirely automated so that no human intervention is generally required. As one example, the user at one device 12 may be a banking institution that desires to use encrypted email communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. System functions involved in presenting on-screen options for humans to respond to (e.g., by clicking on them using a computer mouse) can be automated using software running on the components of the system. Situations where a particular function may involve manual intervention or a computer-implemented operation will be clear from context in the following discussion.

During operation of system 10, certain entities such as a service provider operating a private key service 24 may need to verify that a given party has permission to obtain a private key, to download new client software (including, e.g., a decryption algorithm), to access the contents of a particular message, or to perform other functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use private keys and that can be verified using matching public keys) may be used to ensure that a message or other signed information is associated with a particular party. Sometimes an authentication process in system 10 may involve the generation of a ticket such as a Kerberos ticket or other proof of authorization. User authentication operations are generally described herein without need to distinguish between information such as ticket information that is derived from or based on recipient credential information and the underlying username and password or other recipient credential information that is entered by a user.

Sometimes authentication information and other information (in addition to the messages being sent from the senders to the recipients in system 10) such as public and private keys or client software downloads must be conveyed between parties securely (e.g., between a sender and a private key generator or between equipment associated with a recipient and a private key generator, etc.). A number of different approaches may be used to convey information in system 10 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., because the communications path is physically under the control of a trusted party), and information may be conveyed securely by encrypting the information (e.g., in a message) before sending it over an insecure (or secure) link.

To enhance the efficiency of the IBE and PKI decryption and encryption processes, "two-step" decryption techniques may be used in which a message key (e.g., a symmetric message key) is used to encrypt the contents of a message prior to transmission to the recipient. Public key encryption may then be used to encrypt the symmetric message key. The message that is sent from the sender to the recipient contains the IBE-encrypted or PKI-encrypted message key and the message-key-encrypted message contents. During decryption, the IBE private key or PKI private key corresponding to the public key that was used to encrypt the message key may be used to decrypt the message key. The message key may then be used to decrypt the rest of the message. These two-step processes may be more efficient than "pure" or "single step" encryption algorithms in which the PKI or IBE algorithm alone is used to encrypt the entire message. Both types of approaches (and analogous multi-layer encryption approaches) are generally referred to herein as simply "IBE" or "PKI" or "public key" schemes for clarity.

PKI encryption schemes may be implemented using any suitable scheme. As an example, the well-known RSA cryptographic algorithm may be used for PKI encryption, decryption, digital signatures, and signature verification operations. One or more PKI key generators may be used to generate public-key/private-key pairs. The public keys may be published for use by message senders who desire to encrypt messages using PKI. Any suitable publishing scheme may be used to distribute PKI public keys. For example, PKI public keys may be distributed by users in a peer-to-peer fashion or may be placed on a directory or other public database for access by message senders over network 14, etc. PKI private keys may be made available to users using a private key service 24.

Figure 2:
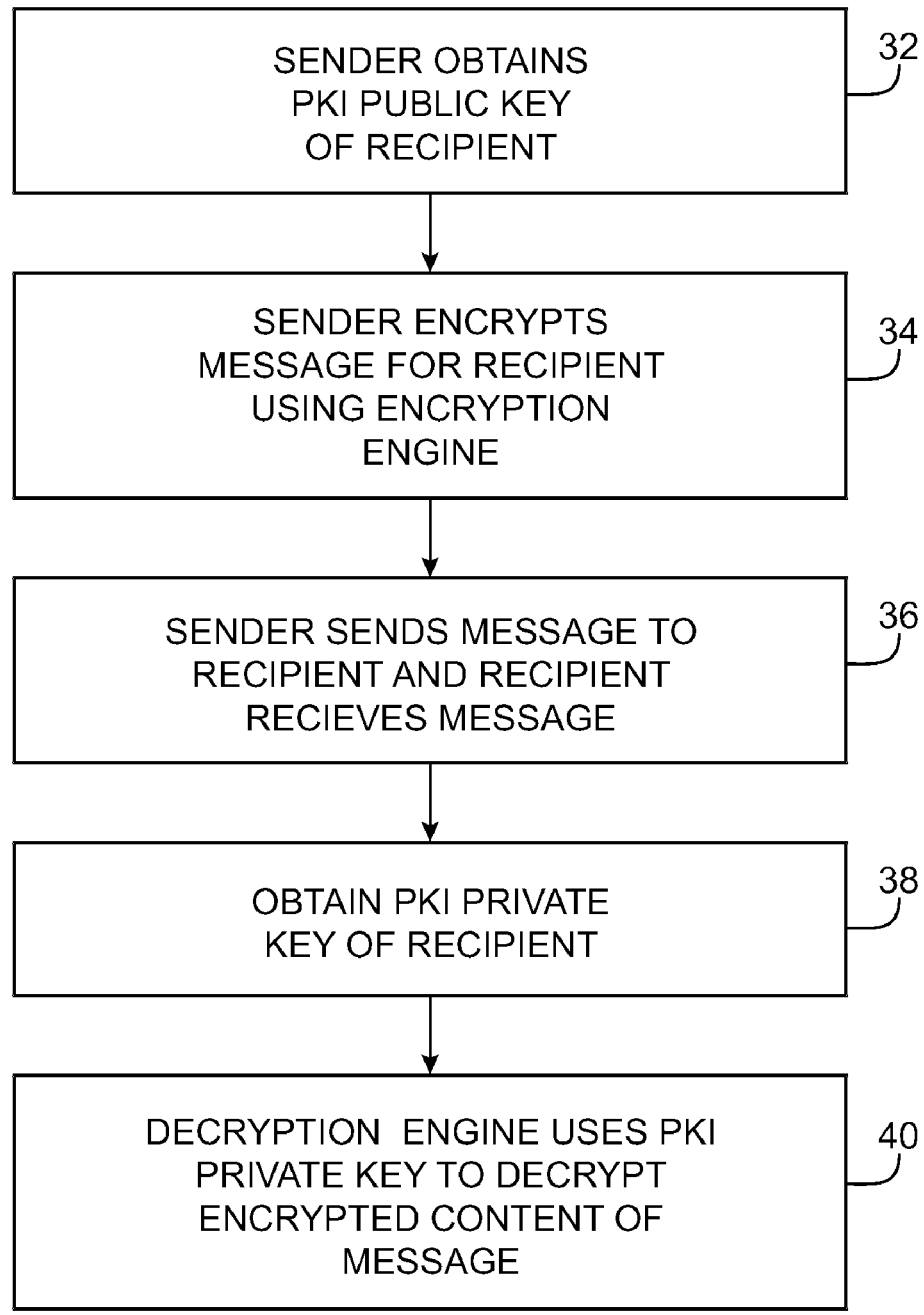
FIG. 2 is a flow chart of illustrative steps involved in using PKI encryption to support secure messaging in accordance with the present invention.

Illustrative steps involved in using PKI techniques to support secure messaging functions in system 10 are shown in FIG. 2.

At step 32, a sender may obtain the PKI public key of a desired recipient. For example, the sender may obtain the PKI public key of a desired recipient from a public database over communications network 14.

At step 34, the sender may encrypt a message for the recipient using the PKI public key of the recipient and a PKI encryption algorithm implemented using the sender's client software. All or part of the message content may be encrypted to create the encrypted message. For example, some information, such as message header information may not be encrypted whereas other information, such as message body text and one or more message attachments, may be encrypted. Clickable links or other interactive components may also be added to the message by the sender's client.

At step 36, the sender may send the encrypted message to the recipient over network 14. The recipient may receive the message. The message may pass through mail servers and other intermediate equipment between the sender's equipment 12 and the recipient's equipment 12.

At step 38, the PKI private key of the recipient may be obtained for use by the decryption engine that is to decrypt the encrypted message. The PKI private key may be obtained from private key service 24 (FIG. 1). In general, cryptographic operations such as message decryption may be performed locally or using a remote service (e.g., a remote decryption service). For clarity, the present invention is often discussed in the context of local operations.

During the process of obtaining the PKI private key, the recipient's credentials may be required (e.g., by a private key service or an associated service) to prove that the key requester is authorized to obtain the private key. If desired, a given recipient may retain a copy of the PKI private key for use in future decryption operations.

At step 40, after the PKI private key has been obtained, the decryption engine (e.g., the decryption engine in the recipient's client) may be used to decrypt the encrypted message content.

System 10 of FIG. 1 may also use IBE cryptographic techniques to encrypt and decrypt messages. IBE encryption schemes for system 10 can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001). See also http://eprint.iacr.org/2001/090 by Dan Boneh and Matthew Franklin. With the approach described in the work of Boneh and Franklin, IBE encryption is based on the properties of bilinear maps such as a Weil Pairing or Tate Paring. For clarity, aspects of the present invention will sometimes be described in the context of an identity-based-encryption scheme such as the elliptic curve implementation described by Boneh and Franklin. This is, however, merely illustrative. Any suitable approach for IBE encryption may be used with system 10 if desired.

Initially, when the system is set up, IBE private key generators (e.g., IBE private key generators such as IBE private key generator 16 of FIG. 1) each obtain or generate a master secret s. For example, each private key generator may create a master secret from a number that is randomly generated at the private key generator by a processor housed inside a tamper-proof enclosure. The master secret may also be produced off-site and delivered to the private key generator 16.

The master secret (also sometimes referred to as a secret master key or a master key) is secret information that is used by the private key generator 16 to generate private keys. The recipient's IBE private key can be used by the decryption engine in the recipient's client to decrypt the encrypted message.

After the master secret s has been obtained, the IBE private key generator may use the master secret in generating IBE public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The IBE public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may make this information available to senders in system 10. The public parameter information may be provided to the senders using any suitable technique. For example, recipients may send the public parameter information to senders in email messages or use other suitable peer-to-peer distribution schemes. If desired, the private key generator 16 may publish the public parameter information by using a directory service or by placing the public parameter information on a particular host server that a sender can reach using an associated domain name or other suitable service name that is generated based on the recipient's public key (e.g., using a known service-name generation rule). These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance (e.g., P may be built into user software) and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the IBE public parameter information (e.g., public parameters P and sP) has been provided to a user (i.e., a sender) who desires to send an IBE-encrypted message to another user (i.e., a recipient), the sender may encrypt and send the message to the recipient. An IBE encryption algorithm in the encryption engine of the sender's client may be used to encrypt the message. The encryption engine may use the public parameter information (e.g., P and sP) and an appropriate IBE public key to encrypt the message. For example, the encryption engine may encrypt the message using the IBE public key associated with the recipient.

When the IBE-encrypted message is received, the IBE private key that corresponds to the IBE public key is used to decrypt the message. The IBE private key is generated by the IBE private key generator 16. A decryption engine that implements an IBE decryption algorithm may be used to decrypt the IBE-encrypted message. The decryption engine takes as inputs the IBE-encrypted message and the IBE private key and produces the unencrypted version of the message as an output. The decryption engine may be implemented in the client running on the recipient's equipment.

The encryption engine and decryption engine may use software to implement the desired IBE encryption and decryption algorithms. The encryption and decryption engines may be provided to equipment in the system as part of the software applications used by senders and recipients (e.g., email messaging software), as part of message management software provided to organizations in system 10, as part of a mail server package, as part of an operating system, as part of a package of server administration tools, as a downloadable program or plug-in that is available to senders, recipients, and other parties in system 10, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by or based on that recipient's email address, name, or social security number. IBE private key generator 16 may generate an IBE private key for appropriate users based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

When a validity period is used as part of an IBE public key Q, it is not permissible to access the contents of a message encrypted using that Q if the current date does not fall within the specified validity period. This policy may be enforced by the private key generators such as private key generator 16. If the current date is not within the validity period specified in the public key, a private key generator will refuse to generate and provide an otherwise authorized key requester (e.g., a message recipient or authorized agent for the message recipient) with a copy of the corresponding private key that is needed to decrypt the message. With this approach, IBE private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com|top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

A sender may send an IBE-encrypted message to multiple recipients. For example, a sender may send a message to a list of distinct email addresses, each associated with a different recipient each of which has a different IBE private key. In this type of scenario, the sender encrypts the message sent to each recipient differently (i.e., using the appropriate IBE public key for each intended recipient).

Figure 3:
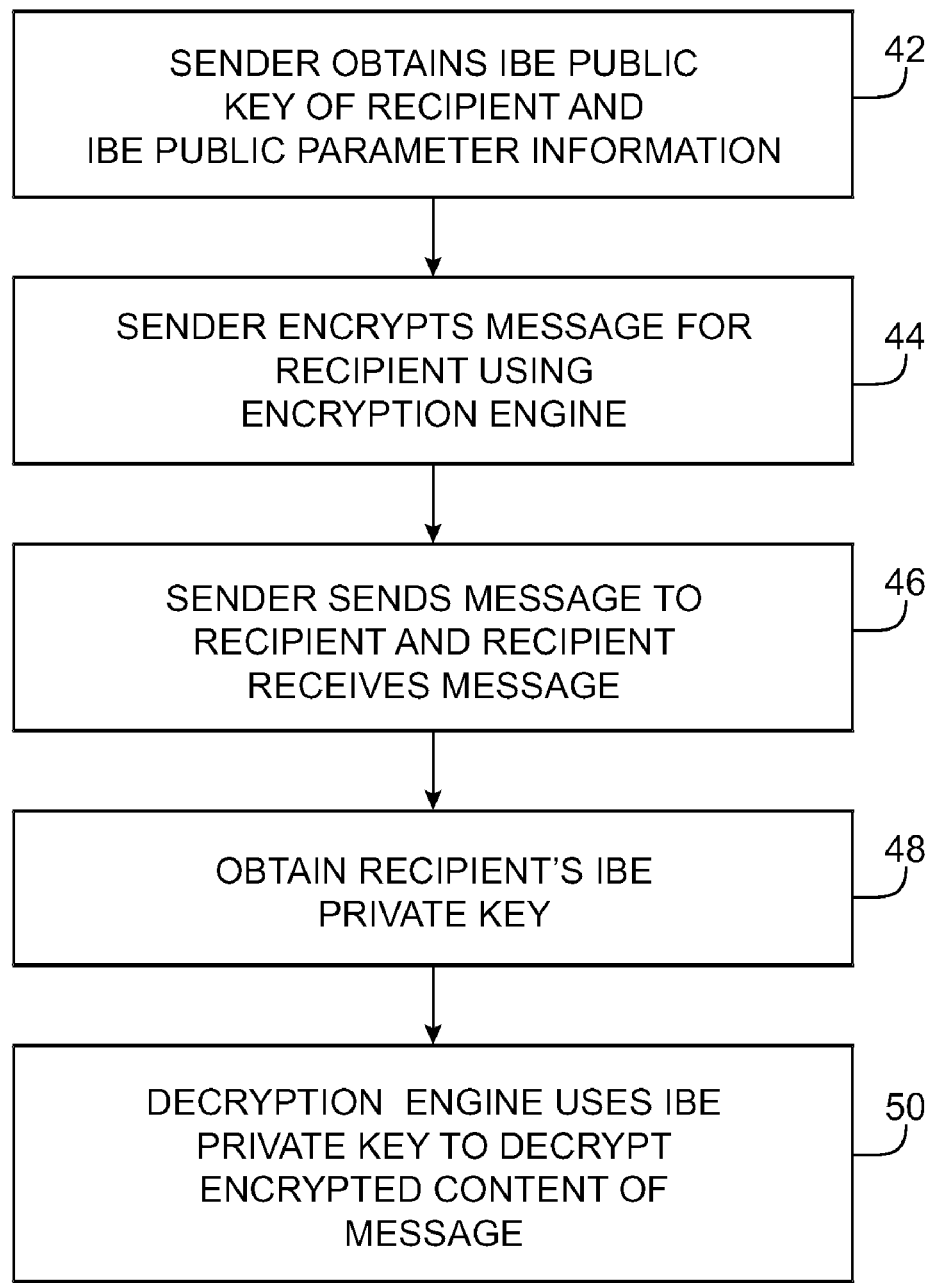
FIG. 3 is a flow chart of illustrative steps involved in using identity-based-encryption techniques to support secure messaging in accordance with the present invention.

Illustrative steps involved in using IBE techniques to send encrypted messages in system 10 are shown in FIG. 3.

At step 42, a sender who desires to send a secure message to a recipient may obtain the IBE public key of the recipient and the IBE public parameter information. Any suitable technique may be used to provide the sender with the recipient's IBE public key Q and corresponding IBE public parameters (e.g., public parameters P and sP). As an example, a sender desiring to send an IBE-encrypted message may have information sufficient to construct the IBE public key Q of the intended message recipient. This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted. The sender may obtain the IBE public parameter information from a recipient, from a directory, from IBE private key generator 16, from an IBE public parameter host service, or from any other suitable entity in system 10.

Once the sender has the IBE public key of the recipient and the appropriate corresponding public parameter information, the sender may, at step 44, use the IBE encryption process (e.g., the process of the work of Boneh and Franklin described above) to encrypt the message contents for the recipient. The IBE process may be implemented using software at the sender's equipment such as an encryption engine. The encryption engine may be a stand-alone process or application or may be incorporated into another process or application (e.g., as part of an email application or other client). The encryption engine may take as inputs (1) the message to be encrypted, (2) the IBE public parameter information (e.g., P and sP), and (3) the IBE public key Q. The IBE process implemented using the encryption engine produces an encrypted version of the message as its output.

At step 46, the sender may transmit the IBE-encrypted message to the recipient over communications network 14 and the recipient may receive the message. A sender may transmit an IBE-encrypted message to a recipient using an email program or other suitable software. To decrypt the message, an appropriate IBE private key must be obtained. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

Before the recipient can obtain the IBE private key needed to decrypt the message content from the private key service 24 and IBE private key generator 16, the authorization of the recipient to obtain a copy of the IBE private key can be verified by the private key service (e.g., by IBE private key generator 16).

Authorization to access the contents of a message may be verified using authentication information (credentials) from the recipient and using other information (e.g., independently-gathered information on the current date). The private key generator 16 may use the access policy embodied in the IBE public key (in conjunction with optional additional policy criteria) to determine whether a given recipient is authorized. The recipient may act alone (i.e., when the IBE private key is used for local decryption) or a remote decryption service may act for the recipient. Once the IBE private key generator 16 verifies that the recipient is authorized to access the message contents, the private key may be generated by the IBE private key generator 16. The decryption engine to be used in decrypting the encrypted content may obtain the IBE private key of the recipient at step 48.

Any suitable authentication scheme may be used to prove to the private key service 24 that the appropriate decryption engine is authorized to obtain the IBE private key. As an example, username and password information may be supplied to the private key service 24. If the username and password information that is provided matches username and password information that the private key service has in a database of valid usernames and passwords, the private key service 24 can release the requested IBE private key. The use of a username and password for authentication is merely illustrative. Biometric information, information from a hardware token, a ticket, or any other suitable recipient credential information may be used for authentication to prove that the decryption engine is authorized to obtain the requested IBE private key.

Regardless of which authentication technique is used by the IBE private key generator 16 to determine that the recipient is authorized to obtain the IBE private key, during step 48, the IBE private key is provided to the decryption engine that is to decrypt the IBE-encrypted message content. The private key is preferably provided to the decryption engine securely. For example, the private key may be downloaded by the decryption engine over the Internet or may be transmitted in a message. A secure communications channel over network 14 may be used for electronic communications between the IBE private key generator 16 and the equipment on which the decryption engine is located.

After the decryption engine obtains the IBE private key, the decryption engine uses the IBE private key to decrypt the encrypted message at step 50.

When a recipient who does not have local decryption capabilities receives a message that has PKI-encrypted or IBE-encrypted content, the recipient can provide the encrypted message to a remote decryption service for remote decryption. This approach may be used, for example, by a recipient who is traveling and is using a public Internet kiosk to access email. Because the Internet kiosk service will not allow members of the public to install software, the recipient cannot install a copy of the decryption engine on the Internet kiosk service. By using the decryption capabilities of the remote decryption service, however, the recipient can access the contents of an encrypted message using a web browser or other software that is already installed on the public Internet kiosk. This approach can also be used by a recipient in an organization where it is not permitted to install decryption software on user terminals.

Figure 4:
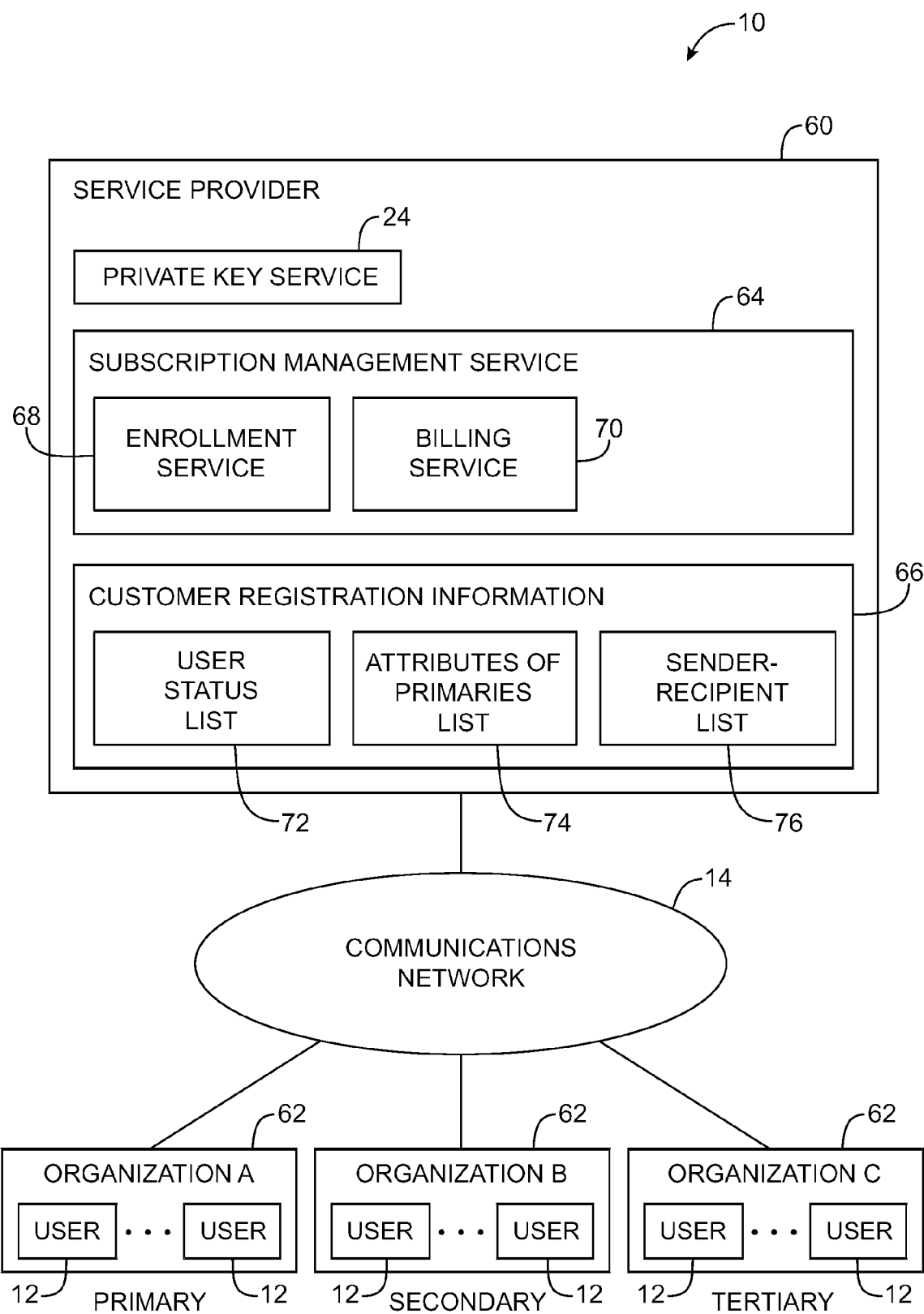
FIG. 4 is a diagram showing how a service provider may use a subscription management service and customer registration information to support operations in a cryptographic system in accordance with the present invention.

As shown in FIG. 4, system 10 may have one or more service providers such as service provider 60 that provide cryptographic services. Service provider 60 may, for example, manage a private key service such as private key service 24 of FIG. 1 that authenticates users and distributes private keys and/or cryptographic client software.

The users 12 in system 10 are generally associated with more than one organization 62. For example, some users may be members of organization A, some users may be members of organization B, and some users may be members of organization C.

The resources of service provider 60 are not unlimited. Accordingly, service provider 60 uses rules to determine how each user in system 10 should be handled. Some users may be provided with nearly unlimited access to client software and copies of their private keys from service 24. Other users may only be granted temporary user status.

Service provider 60 may have a subscription management service 64 for handling subscriber-related tasks such as enrollment operations (enrollment service 68) and billing operations (billing service 70). The service provider 60 maintains subscriber information (e.g., customer registration information 66) that is used in handling these tasks.

The users in system 10 may be categorized by virtue of their relationship with service provider 60.

Some users (referred to herein as "primary users" or "primaries") may be members of organizations (called "primary organizations" or "primaries") that are direct customers of the service provider 60. Primary users should be entitled to a relatively high level of user benefits. Primaries may, for example, be entitled to freely encrypt and decrypt email using private key service 24.

Other users (referred to herein as "secondary users" or "secondaries") are business associates of the primaries and are therefore need to send and receive secure messages with the primaries. Because the primaries have already subscribed to the services of service provider 60 and because the primaries do not generally want to impose burdens on their business associates, the service provider 60 generally provides the secondaries with the ability to securely communicate with the primaries at no charge.

Still other users (referred to herein as "tertiary users" or "tertiaries" might receive only limited services from service provider 60. Rather than unlimited services, a tertiary might receive a 30-day free trial subscription with service provider 60. A tertiary might be, for example, a user to whom a secondary has forwarded an encrypted email from a primary. The secondary is allowed to send unlimited encrypted emails to a primary by virtue of the primary's elevated status, but a secondary is not allowed to send unlimited encrypted emails to unrelated third parties (tertiaries). If a secondary desires to have unlimited secure communications with a tertiary, the secondary (or tertiary) must subscribe to the services of the service provider and become a primary.

In general, service provider 60 may provide any desired level of service to each level of users. For example, primaries may be billed a flat fee or may be billed on a per-message basis. Tiered billing rates may be used depending on the size of an organization, etc. As another example, secondaries may be charged for decrypting more than a certain number of messages from a primary, rather than being given unlimited decryption rights. Similarly tertiaries may be provided with free temporary passes or may be charged for their passes, etc.

Service provider 60 may also recognize more than three categories of users. As an example, the service provider may provide certain types of tertiaries (e.g., tertiaries with forwarded email from particular high-service-level primaries) with unlimited services for 60 days and may provide other tertiaries (e.g., tertiaries with forwarded email from low-service-level primaries) with five day passes.

Although different types of service levels and categories of users may be defined and their activities managed by service provider 60, an illustrative example will be presented for clarity. In the illustrative example, there are three levels of user: primaries, secondaries, and tertiaries. Each level of user has a different level of permitted service.

In this example, organization A of FIG. 4 and its users are considered to have primary status. Organization A may be, for example, a corporation that has paid service provider 60 for unlimited secure email services. This allows the users of organization A to send encrypted emails to any desired user.

The direct recipients of the encrypted emails may be users at an organization B that has not subscribed to the services of service provider 60. The users at organization B that receive emails from the primaries at organization A are secondaries, because they have received a secure communication directly from a primary.

A secondary user at organization B (in this example) is not permitted to originate secure email messages (the secondary would need to become a primary to be permitted to originate such emails). However, the secondary at organization B may be permitted to forward the encrypted email to a user at organization C. In this example, organization C has not subscribed to the services of service provider 60, so the recipient of the forwarded email at organization C is a tertiary.

If the rights of the tertiary at organization C have not expired, the tertiary may be provided with a temporary pass that allows the tertiary to (temporarily) obtain the client software and private key needed to decrypt the encrypted forwarded email message.

This type of scheme allows primaries to send secure email to any users. These users are secondaries and are therefore provided with unrestricted rights to reply to the primaries. The secondaries are not permitted to originate secure mail without subscribing to the service and becoming primaries, but are provided with limited rights to forward encrypted email to tertiaries, thereby enhancing the usefulness of the service. Tertiaries can be provided with a limited opportunity to decrypt encrypted email forwarded to them by secondaries. For example, tertiaries can be provided with an opportunity to download the client software used for decryption operations and can be provided with the private keys necessary to perform decryption operations during a trial period of a fixed duration.

The customer registration information 66 may include a user status list 72, a list of the attributes of the primaries 74, and a sender-recipient list 76.

The user status list 72 (FIGS. 4 and 6) may be used to maintain information on whether users are primaries, secondaries, or tertiaries. The user status list 72 may also include information that identifies the primary organization (direct customer) associated with each user. Even if a user is a tertiary (e.g., at organization C), there is an underlying primary organization (e.g., organization A) who has subscribed to the cryptographic services of service provider 60 and that is responsible for the tertiary's inclusion on the user status list 72.

The attributes of primaries list 74 (FIGS. 4 and 7) may be used to associate the identities of the primary organizations (e.g., organization A in the example of FIG. 4) with their domain names. This information may be used by service provider 60 when determining how to satisfy a service request from a user for a client software download or private key. The service provider 60 can use the domain name (and sender-recipient mapping information provided in the email) to determine whether a given email originated from a sender at organization A (a customer of the service provider) or a sender at organization C. If the email originated from a sender who is a primary at organization A, the service provider will satisfy the service request.

Sender-recipient list 76 (FIGS. 4 and 8) may be used to maintain an audit trail for encrypted email messages sent using the system. Information on the sender and recipient of each message may be retained in list 76. If the integrity of the system 10 is compromised (e.g., because a user provided a copy of the client software to an unauthorized user), the service provider 60 (or an independent data mining service) can use the information in list 76 to help determine where the breach in security took place.

To ensure that users of system 10 are appropriately categorized when they request a service from service provider 60, the client software that is used to send secure messages in system 10 preferably labels each encrypted email with information on the sender and recipient. This information (referred to herein as "sender-recipient mapping information" maps a recipient to a sender. The sender-recipient mapping information can be authenticated (e.g., using a digital signature, hash function, etc.), so that the sender-recipient mapping information can serve as proof to the service provider that a given sender sent a communication to a given recipient.

When a recipient receives an encrypted message or at another suitable time, the recipient can submit a service request to the service provider 60. The service request may be, for example, a request for a download of the client software to be used in encrypting and decrypting a message and/or a request for a private key to decrypt a message. If necessary, the service provider can examine the mapping information in the request to determine the status of the sender and recipient. The service provider may then process the service request appropriately.

The sender-recipient mapping information may be provided using any suitable arrangement. For example, it may be included as an attachment to a message or in the body of a message. The sender-recipient mapping information may also be provided in a separate transmission that is associated with the message, etc.

Figure 5:
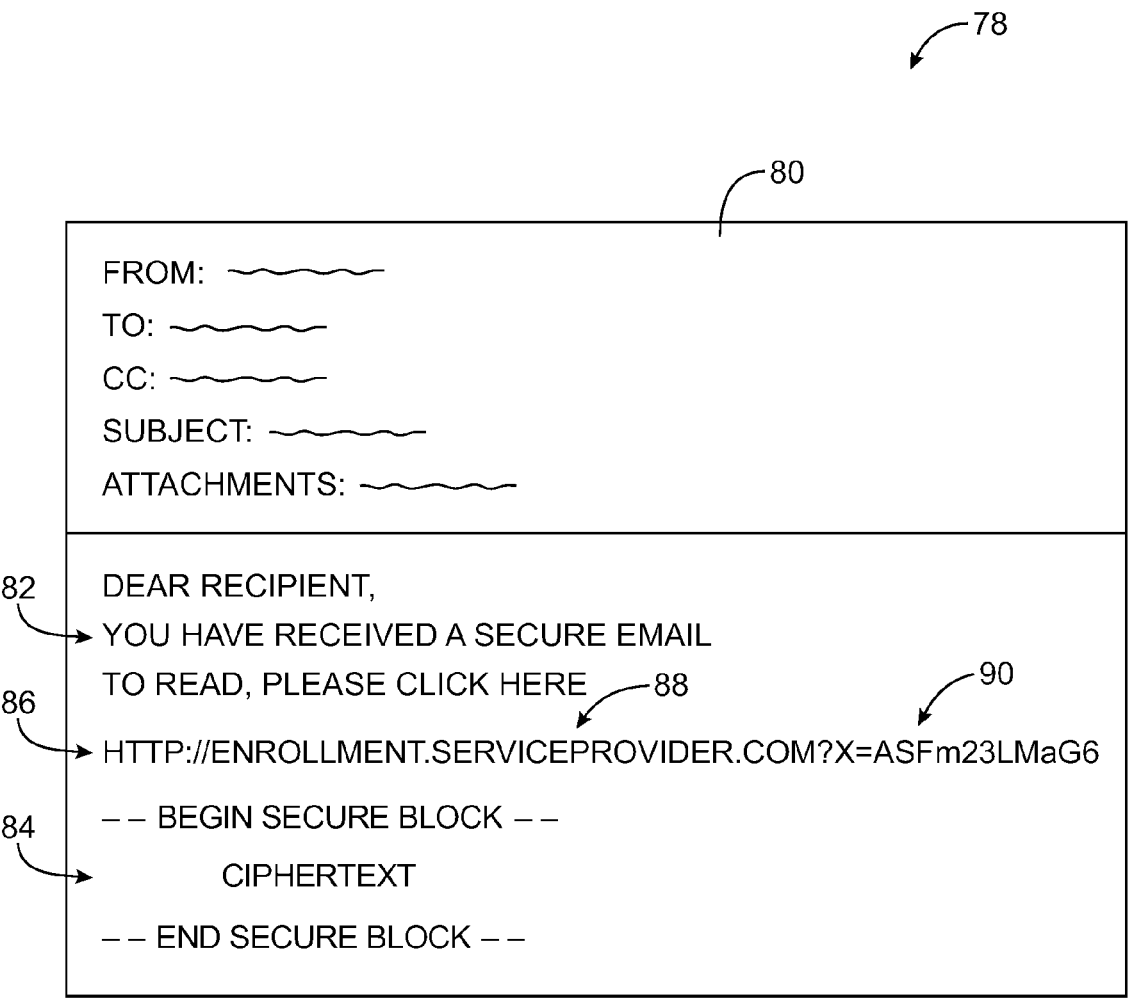
FIG. 5 is a diagram of an illustrative email message containing a link that a recipient can click on to submit a service request to a service provider in accordance with the present invention.

An illustrative encrypted email that contains sender-recipient mapping information is shown in FIG. 5. Email message 78 has a header 80 containing information such as the sender's email address (the "from" entry), the recipient's email address (the "to" entry), the cc recipient's email address (the "cc" entry), subject of the email and attachments.

The encrypted message content (ciphertext 84) may (as an example) be provided in the body of the message 78. The body of the message may also contain instructions 82 that inform the user that the user should click on link 86. When the user clicks on link 86, the user's web browser is automatically launched on the user's equipment. The web browser submits the information in the link 86 to the appropriate destination. The service provider's domain name is preferably included in the domain name portion 88 of link 86, which ensures that the information in link 86 is directed to the service provider 60 over network 14. Sender-recipient mapping information 90 may be included in link 86. This information is also submitted to the service provider 60 when the user clicks on link 86. The sender-recipient mapping information may be presented using any suitable format. In the example of FIG. 5, a base-64 encoded version of the sender-recipient mapping information 90 is shown.

The process of clicking on link 86 serves to generate a service request from the recipient to the service provider. The service request may be used to obtain a client software download or a private key from private key service 24. A new user will generally download the client software and a private key. An established user may only need to obtain an up-to-date private key.

The sender-recipient mapping information 90 that is submitted to the service provider with the service request is preferably in a form that ensures its integrity and allows its authenticity to be verified. Any suitable arrangement for authenticating the sender-recipient mapping information for verification by the service provider may be used.

One illustrative authentication approach is for the sender to form a string by concatenating the sender's email address (sender identity information) and the recipient's email address (recipient identity information) and to digitally sign the string. Any suitable digital signing process may be used. For example, the sender can use the senders' private key to sign the string and can include a certificate signed by a trusted certificate authority that includes the sender's identity and the sender's associated public key signed by the certificate authority. At the service provider, the service provider uses a known value of the certificate authority's public key (e.g., a known value built into an operating system at the service provider) to verify the certificate authority's signature. If the certificate is valid, the service provider can then use the information from within the certificate to verify the signed string. This verifies the contents of the string, i.e., the sender-recipient mapping information made up of the sender and recipient email addresses.

Another illustrative sender-recipient mapping information authentication approach involves the use of authentication and verification operations based on hash functions. With this type of approach, the sender may create a sting by concatenating the sender's email address, recipient's email address, and a secret. The sender may then use a hash function to calculate the hash of this string. The hashed version of the string may be used in the authenticated sender-recipient mapping information. The process of producing the string and the hash of the string may be performed automatically by the client software at the sender. To maintain the secrecy of the secret, an obfuscated version of the secret can be embedded in the client software used by the sender. A recipient can generate a service request that includes the hashed value of the string, the sender's email address, and the recipient's email address. The service provider knows the value of the secret from an earlier system set-up process, so the service provider can calculate the hash of the concatenation of the sender's email address, recipient's email address, and secret and can compare the value of this calculation to the value of the hashed string provided in the request. If the two values match (i.e., if verification of the authenticated sender-recipient mapping information is successful), the service provider can be assured that the sender associated with the sender's email address sent the recipient associated with the recipient's email address a communication.

These are merely illustrative techniques that may be used for authenticating the sender-recipient mapping information. Any suitable arrangement may be used if desired.

Once the service provider has verified the sender-recipient mapping information, the service provider can be assured of truthfulness of the recipient's assertion that the sender has sent the recipient a communication. The service provider can therefore rely on this information in categorizing the recipient and can provide services accordingly.

Figure 9A:
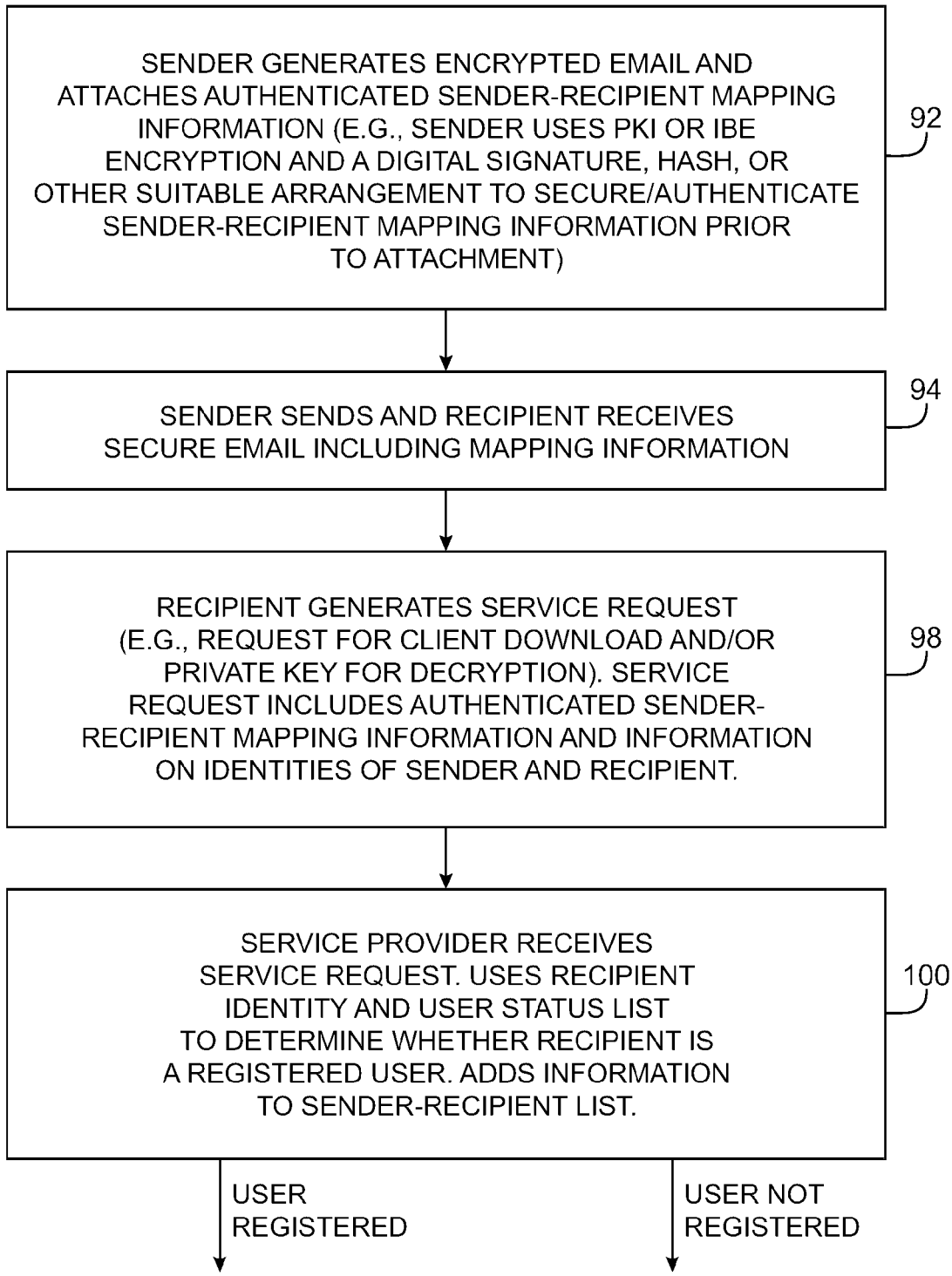
FIG. 9a and FIG. 9b contain a flow chart of illustrative steps involved in satisfying a service request in accordance with the present invention.
Figure 9B:
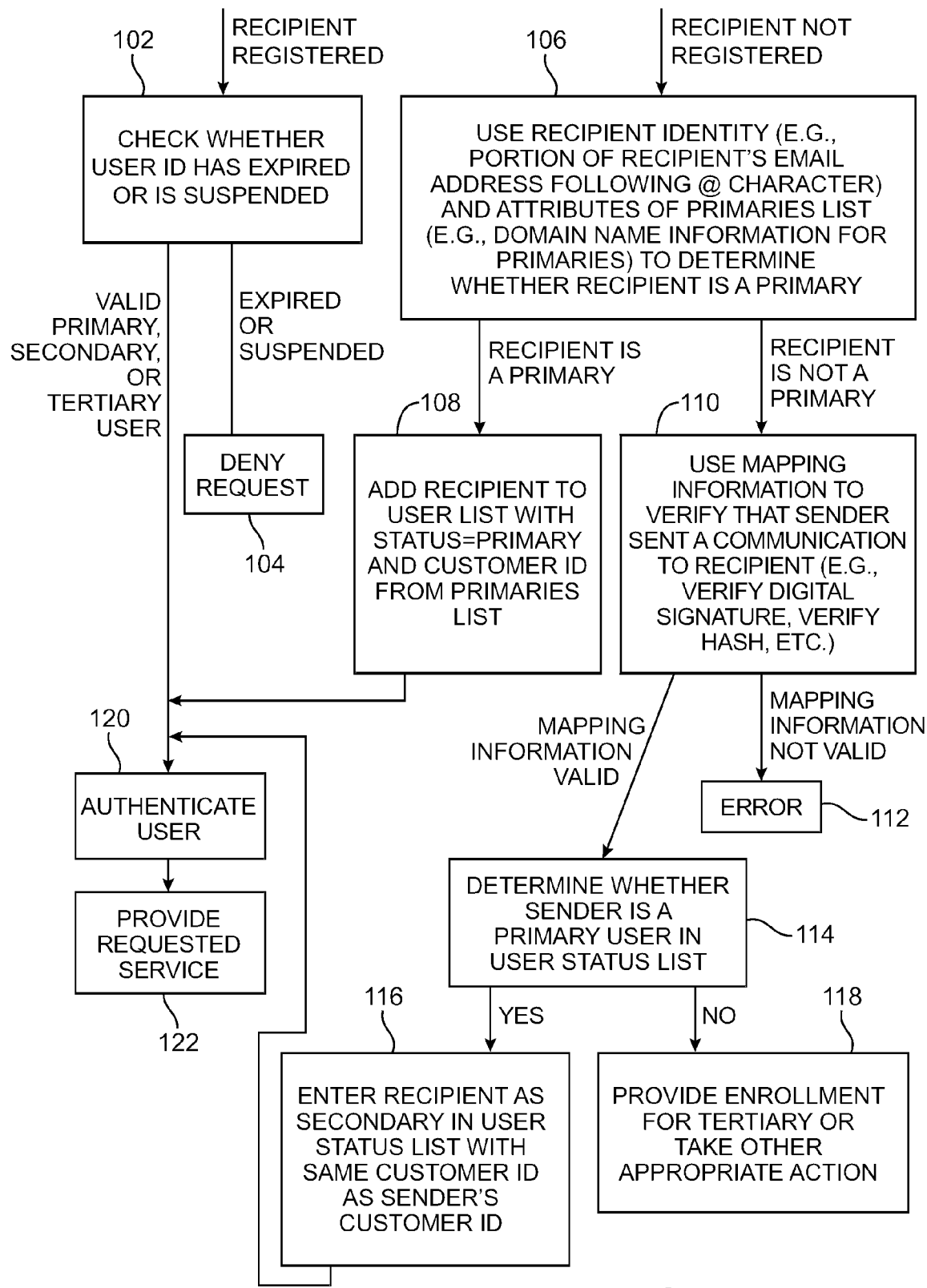

Illustrative steps involved when service provider 60 processes a service request in system 10 are shown in FIGS. 9*a* and 9*b*. A service request may be a request by a recipient for a client software download or a private key or other services provided by the service provider 60 for which it is desired to restrict access based on user status. Typically a service request is generated in response to receipt of an encrypted email.

An encrypted email may be generated by a sender at step 92 using the PKI or IBE private key of the sender. During step 92, the sender creates the authenticated sender-recipient mapping information (e.g., by creating a string from a concatenation of sender and recipient email addresses, a secret if a hash is being used, etc. and by digitally signing or hashing this string). The authenticated sender-recipient mapping information is provided to the recipient of the email. One suitable technique for providing the authenticated sender-recipient mapping information to the recipient is to attach the authenticated sender-recipient mapping information to the encrypted email during step 92 (e.g., by embedding this information in a link such as link 86 of FIG. 5). The authenticated sender-recipient mapping information serves as proof that the sender is sending the recipient an email communication.

At step 94, the sender sends the encrypted email message including the authenticated sender-recipient mapping information to the recipient and this information is received by the recipient.

At step 98, the recipient of the encrypted email may generate a service request (e.g., to obtain the client software and/or to obtain the recipient's private key from private key service 24 for use by the recipient's client software in decrypting the messages). The service request may include the authenticated sender-recipient mapping information and information on the identities of the sender and recipient such as the sender's email address and the recipient's email address. The sender and recipient identity information (email addresses) may be added to the service request by the recipient (e.g., using information from the email header) or may be provided as part of the authenticated sender-recipient mapping information. The service request may be provided to the service provider 60 over network 14.

At step 100, the service provider receives the service request. The sender and recipient information from the service request can be entered into the sender-recipient list 76 (FIGS. 4 and 8). The service provider also uses the recipient's email address or other recipient identity information from the service request to query the user status list 72 (FIGS. 4 and 6). If the recipient does not appear in the user status list 72, the recipient is not a registered user (i.e., the recipient is not a known primary, known secondary, or known tertiary).

Because the recipient is not registered (in this situation), the service provider checks to determine whether the recipient is eligible to access the services of the service provider. The service provider 60 may determine the recipient's status using the recipient's email address (or other recipient identity information or user ID) and (if necessary) the sender's email address or other sender identity information or user ID.

As shown in FIG. 9*b*, at step 106 the service provider may use the recipient identity information and the attributes of primaries list 74 to determine whether the recipient is a primary. With one suitable arrangement, the attributes of primaries list 74 contains entries specifying which domain names are used for sending (and receiving) email from each primary organization. The domain names may be associated with gateways and/or mail servers in the networks of the primary organizations. The service provider can compare the domain name portion of the recipient's email address (the portion of the email address after the "@" symbol) to the domain names in the attributes of primaries list. If there is a match between the recipient's email address and one of the listed primaries, the service provider can conclude that the recipient is a primary.

An illustrative list of primary attributes 74 is shown in FIG. 7. In this example, the organization "Company W Inc." is a primary and list 74 contains information identifying the company (i.e., the customer ID "Company W, Inc.") and the domain name(s) associated with email communications at the company (i.e., the domain name "companyw.com"). By comparing the domain name portion of the recipient's email address to the domain name entries in list 74, the service provider can determine whether the recipient is part of a primary organization and is therefore a primary user, even if the recipient has not previously registered with the service provider and does not yet appear in user status list 72. If, for example, the recipient's email address is recipient1@companyw.com, the service provider can conclude that the recipient is a primary by virtue of being an employee of the service provider's direct customer Company W, Inc.

If there is a match between the recipient and a listed primary, at step 108 the service provider registers the user by adding the recipient to the user list 72 as a primary, as shown in the last row of the illustrative user status list 72 of FIG. 7. Because the recipient's status is now listed as "primary," the next time the recipient makes a service request to the service provider, the service provider will recognize the recipient as a registered user at step 100 (FIG. 9*a*).

After adding the recipient to the user status list 72 at step 108, the service provider authenticates the recipient at step 120. Any suitable authentication arrangement may be used (e.g., an arrangement based on recipient credentials such as username and password, etc.) If desired, the service provider may use different authentication processes for different types of users.

After the recipient has been authenticated, the requested service (i.e., the client download and/or private key for decrypting the message) may be provided to the recipient at step 122.

If, at step 106, the domain name portion of the recipient's email address did not match a domain name entry in the attributes of primaries list 74, the service provider verifies that the sender-recipient mapping information is authentic at step 110. The way in which the mapping information is processed depends on the type of proof used (i.e., whether a digital signature scheme or a hash-based authentication scheme is used). If the sender-recipient mapping information cannot be verified (i.e., the sender's digital signature is not valid or the comparison of hash values does not produce a match), the service provider generates an error message at step 112.

If the service provider is able to verify the sender-recipient mapping information, the service provider can be assured that the sender identified by the recipient in making the service request is the actual sender of a message to the recipient. The service provider can therefore rely on the sender's identity information (e.g., the sender's email address) to determine whether or not the sender is a valid primary in the user status list 72. This can be done at step 114 by examining the user status list 72 to determine whether the sender's email address is listed and, if listed, to determine the status of the sender (i.e., primary, secondary, or tertiary).

As shown in the example of FIG. 6, some users (e.g., user1@xyzcorp.com) are secondaries, because their organization (XYZ Corporation) is not a listed primary. The status of a secondary derives from receiving communications from a primary. In the example of FIG. 6, user1@xyzcorp.com is a secondary by virtue of having received email from a primary at one of the service provider's direct customers (ABC firm).

Other users are primaries. For example, the second row of FIG. 6 contains an entry for the primary user2@abcfirm.com. (All senders are registered users, because, in a preferred embodiment of the system, a sender cannot obtain the client software for sending and receiving encrypted messages without registering with the service provider.) If, at step 114, the service provider determines from the user status list 72 that the sender of the recipient's email is a primary, the service provider can conclude that the recipient is a secondary. Accordingly, at step 116, the service provider enters the recipient in user status list 72 with the status of "secondary." The customer ID (company name) of the primary organization of the sender is included in the entry under the heading "customer ID"). User status list 72 therefore contains a list of users and their status with the service provider along with information on the primaries that caused the users to be listed.

After the service provider has entered the recipient into the user status list 72 as a new secondary at step 116, the service provider can authenticate the recipient (step 120) and provide the requested service to the recipient (step 122).

If, at step 114, the service provider determines from the user status list 72 that the sender of the recipient's email is not a primary, service request processing proceeds to step 118. At step 118, the service provider takes appropriate action depending on the status of the sender. For example, if the sender is a secondary, the service provider can conclude that the recipient is a tertiary. Accordingly, at step 118, the service provider can provide the recipient with suitable enrollment options (web pages, etc.) that allow the recipient to register as a temporary user (e.g., as a tertiary with a temporary pass). A tertiary user with a valid temporary pass can be authenticated and provided with an appropriate service (steps 120 and 122).

Once users have registered with the service provider, they can be treated as known users during the initial screening process (step 100 of FIG. 9a). If, at step 100, the service provider determines that the recipient appears in the user status list 72, the service provider can conclude that the recipient is a registered user and can use the recipient's identity information (e.g., email address) to check the recipient's status at step 102 (FIG. 9b). If the status information in the user status list 72 indicates that the recipient's rights have expired (as with the illustrative user3 in the third row of the user status list 72 of FIG. 6) or if the status information indicates that the recipient has been suspended or is otherwise not authorized, the service provider can deny the service request at step 104. An example of a user whose rights have been suspended is shown in the fourth entry of table 72 of FIG. 6. This user—user5@qrscorp.com—is no longer an active employee of the customer QRS, Inc., so customer QRS, Inc. has suspended user5's secure email privileges.

If, at step 102, the service provider determines that the recipient is a valid primary, secondary, or tertiary, the service provider can authenticate the recipient (step 120) and satisfy the service request (step 122).

The techniques of FIGS. 9a and 9b allow various types of users to register with the service provider and allow the service provider to provide appropriate services to users based on their status. Other techniques may be used to provide subscription management services if desired.

For example, users may be preregistered with the service provider before they are allowed to send and receive secure email. This technique generally will not allow for ad hoc transmission of emails to new users, only between registered users.

As another example, users may be preregistered and certain trusted entities may be allowed to register secondaries. With this approach, a system administrator at a primary organization or primary users themselves may be permitted to sign up secondaries with the service provider. Any suitable technique for registration may be used. As an example, a system administrator at a primary organization or a primary user may be provided with a web page by the service provider into which the administrator or primary user may type the email address of the desired secondary. The service provider can then add the new user into the user status list 72. As another example, the system administrator or primary user may forward or otherwise send an email message to an enrollment email address (e.g., enrollment@serviceprovider.com). The enrollment email message may contain the identity (email address) of the desired new secondary. The service provider can add the secondaries by examining the emails sent to the enrollment email address.

An autoenrollment process may also be used. with one suitable autoenrollment arrangement, a gateway server in an organization's network may be used to automatically examine outgoing emails. If an email is sent to an outside recipient, the gateway server can automatically submit a registration request to the service provider. Automatic detection of messages sent to new users relieves the administrator and primary users in the primary organization from manual registration operations.

If desired, an autoenrollment process may be implemented using email "carbon copies" (ccs or bccs). Whenever a secure email is sent to a new recipient, the sender can include the registration service of the service provider (e.g., enrollment@serviceprovider.com) as a copy recipient (regular or blind) on the email. The cc process may be transparent to the sender. For example, the sender's email program or other suitable client software may have buttons such as "send," "send secure," and "send secure to new recipient." If the user selects the "send" option, the email that the sender has composed will be transmitted over network 14 without encryption. Selecting the "send secure" option will transmit an encrypted version of the email. When "send secure to new user" is selected, the email is encrypted and sent to the new user and an enrollment message (either a copy of the original or a message in another suitable format) will be automatically sent to the service provider (e.g., enrollment@serviceprovider.com). Automating the enrollment process in this way relieves the burden on the sender to remember to include the enrollment server as a copy recipient in the email. If desired, the client can send enrollment messages to the service provider each time a message recipient does not appear in the sender's address book or other locally-maintained list of message recipients. To avoid excessive transmission of enrollment messages, the client can automatically update the local message recipient list.

Another enrollment technique that may be used involves the use of a web page or other suitable front end process through which recipients can enroll themselves. With this approach, a recipient who has received an email can use a web browser to access the service provider 60. The service provider then asks the recipient who the recipient received the email message from. The recipient types in the email address of the sender. The service provider uses the email address of the sender to check whether the sender is already registered as a primary or a secondary. If the sender is a registered primary or secondary, the service provider can register the recipient and provide the necessary client software and private key to the recipient for the recipient to use in decrypting encrypted emails. If the sender is not a known primary or secondary, the service provider can decline to register the user.

The process of providing web-based enrollment pages to the recipient may be initiated during a service request. For example, a recipient of an encrypted email message may be directed to click on a hyperlink in the message to decrypt the message. When the recipient clicks on the link, the service provider may present the recipient with a web page that directs the recipient to enter the sender's email address. If the sender is a primary or secondary, the recipient will be registered by the service provider. The recipient may then be provided with a web page for authentication. For example, the recipient may be provided with a web page that asks the recipient to enter username and password information. Following authentication, the recipient may be provided with the private key and (if desired) client software for decryption.

If desired, the service provider can contact the sender to determine whether the sender email address provided by the recipient is genuine. For example, the service provider can automatically send an email to the sender identified by the recipient after the recipient enters the sender's email address. The email can contain an embedded hyperlink. The email can also include instructions that direct the sender to click on the link to help prove to the service provider that the sender sent the recipient an email. When the sender clicks on the link, the sender's web browser is launched and displays on on-screen option for the sender (e.g., buttons labeled "yes I sent this recipient an email" and "no, I did not send this recipient an email"). If the sender responds affirmatively, the service provider can conclude that the sender actually sent a message to the recipient as asserted by the recipient. The service provider can therefore rely on the sender's identity in determining the status of the recipient.

An advantage of using a system in which the sender's client software automatically signs (or otherwise authenticates) the mapping between the original sender's identity and the recipient's identity is that such systems do not rely on the integrity of the recipient and do not require the sender to be available to confirm that a message was sent earlier. Once verified, the authenticated sender-recipient mapping information that is included with the email serves as proof that the sender sent an email to the recipient and ensures that the recipient has not fabricated the sender's email address in the service request.

The authenticated sender-recipient mapping information may be provided to the service provider using any suitable technique. For example, the recipient can click on a link embedded in the encrypted email so that the recipient's web browser will automatically send the service request information to the service provider, as described in connection with FIG. 5. The recipient can also make a service request by forwarding the encrypted email to the service provider (e.g., to an appropriate email address such as "enrollment@serviceprovider.com").

Figure 10:
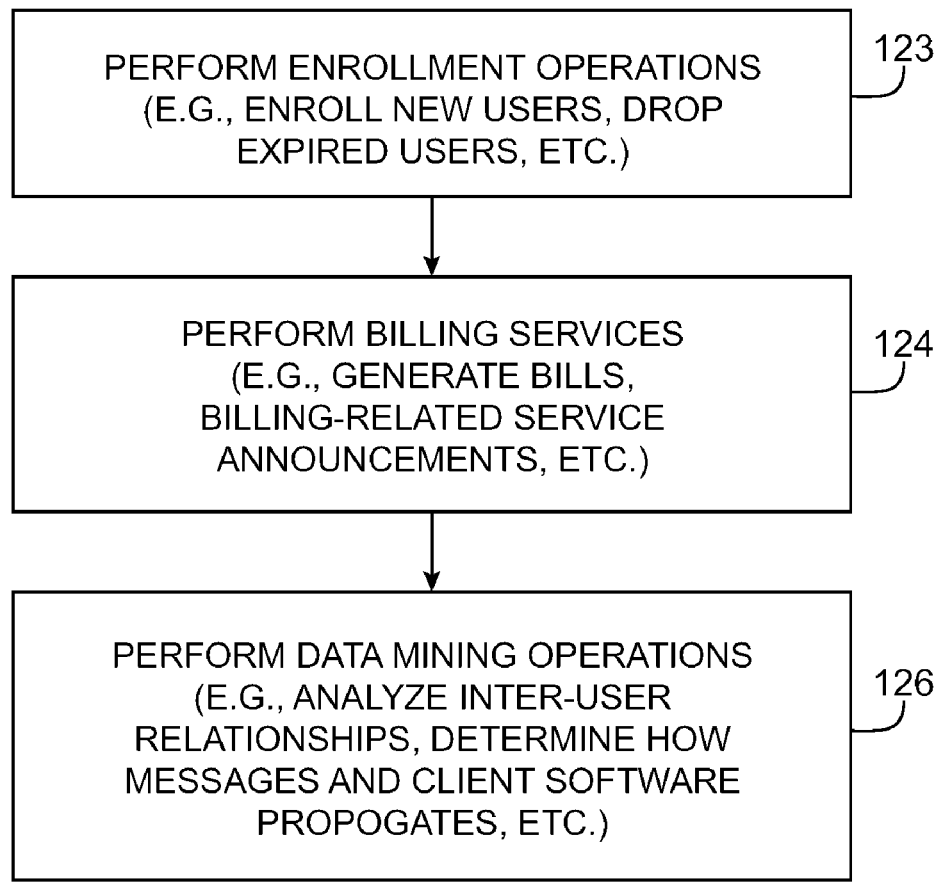
FIG. 10 is a flow chart of illustrative steps that may be performed using subscription management service database information in accordance with the present invention.

The capabilities of subscription management service 64 (FIG. 4) may be used for enrollment operations, billing operations, data mining operations, or any other suitable operations. Illustrative steps involved in using subscription management service 64 are shown in FIG. 10.

At step 123, enrollment service 68 may be used to enroll new users, drop expired users, and to perform other suitable enrollment operations as described, for example, in connection with FIGS. 9a and 9b. The enrollment service 68 may use the information on users that is contained in customer registration information 66 in providing services. For example, the enrollment service 68 may dispense an unlimited number of private keys to primaries and secondaries, but may only provide private keys to tertiaries in limited numbers or for a limited duration. As another example, service 68 may allow the users in one organization or part of one organization (e.g., users associated with a given domain name) to use that organization's domain controller for authentication, whereas service 68 may require call center involvement when authenticating users in another organization. Primaries that pay a premium may be allowed to use special features (e.g., return email receipts) or such features may be reserved for primaries and may not be available for secondaries or tertiaries. Some users may be long-term users (primaries or secondaries), whereas other users may be in a pilot program with temporary access to private keys for decryption (e.g., tertiaries).

At step 124, billing service 70 may perform billing services. For example, billing service 70 may generate bills for primaries, may generate announcements for primaries and secondaries, etc. The bills and announcements may be provided to users via email. Billing service 70 may use the customer registration information 66 in preparing bills. As an example, billing service 70 may bill primary organizations depending on their size (number of registered primary users), billing service 70 may decline to bill secondaries, billing service 70 may bill primary organizations for their secondaries but not tertiaries, etc.

If desired, each private key request serviced by private key service 24 may be logged with a date stamp and requesting user's ID (i.e., recipient email addresses). The billing service 70 can determine (for each user ID) whether there has been an associated key request in the last 30 days (as an example). If there has been activity in the last 30 days, the billing service 70 may use the user status list 72 to determine which customer ID (primary organization) is associated with the active user. The billing service may then generate a bill for that primary organization that reflects the recent activity.

Data mining operations may be performed at step 126 (by subscriber management service 64, other processes running at service provider 60 or any other suitable entity). During data mining operations, information in customer registration information 66 such as the entries in sender-recipient list 76 may be analyzed to determine the nature of the relationships between various users, to determine how message and client software propagates in the system (e.g., to prevent fraud or diagnose the cause of a security breach), etc.

The foregoing is merely illustrative of the principles of this invention and various modifications can be made by those skilled in the art without departing from the scope and spirit of the invention.

What is claimed is:

1. A method for processing service requests at a service provider in a system in which users communicate by sending and receiving encrypted messages over a communications network, comprising:

at a sender, creating an encrypted message with sender-recipient mapping information and sending the encrypted message with sender-recipient mapping information to a recipient over the communications network, wherein creating the encrypted message comprises encrypting a message with a public key associated with the recipient to create the encrypted message;

at the recipient, receiving the encrypted message and sender-recipient mapping information;

at the recipient, submitting a service request to the service provider, wherein the service request includes the sender-recipient mapping information;

at the service provider, using the sender-recipient mapping information to determine whether the sender is a primary user in an organization that is a direct customer of the service provider and, if the sender is a primary user, satisfying the service request of the recipient, wherein the sender has an email address and the recipient has an email address;

at the sender, creating a string containing the sender's email address and the recipient's email address; and at the sender, creating the sender-recipient mapping information by digitally signing the string.

2. A method for processing service requests at a service provider in a system in which users communicate by sending and receiving encrypted messages over a communications network, comprising:

at a sender, creating an encrypted message with sender-recipient mapping information and sending the encrypted message with sender-recipient mapping information to a recipient over the communications network, wherein creating the encrypted message comprises encrypting a message with a public key associated with the recipient to create the encrypted message;

at the recipient, receiving the encrypted message and sender-recipient mapping information;

at the recipient, submitting a service request to the service provider, wherein the service request includes the sender-recipient mapping information; and at the service provider, using the sender-recipient mapping information to determine whether the sender is a primary user in an organization that is a direct customer of the service provider and, if the sender is a primary user, satisfying the service request of the recipient, wherein the sender has an email address, the recipient has an email address, and the sender has client software with an embedded secret, and wherein creating the encrypted message with sender-recipient mapping information comprises:

at the sender, using the client software to generate a string based on the sender's email address, the recipient's email address, and the secret; and at the sender, using the client software to hash the string to produce the sender-recipient mapping information.

3. A method for processing service requests at a service provider in a system in which users communicate by sending and receiving encrypted messages over a communications network, comprising:

at a sender, creating an encrypted message with sender-recipient mapping information and sending the encrypted message with sender-recipient mapping information to a recipient over the communications network, wherein creating the encrypted message comprises encrypting a message with a public key associated with the recipient to create the encrypted message;

at the recipient, receiving the encrypted message and sender-recipient mapping information;

at the recipient, submitting a service request to the service provider, wherein the service request includes the sender-recipient mapping information;

at the service provider, using the sender-recipient mapping information to determine whether the sender is a primary user in an organization that is a direct customer of the service provider and, if the sender is a primary user, satisfying the service request of the recipient;

using the sender-recipient mapping information at the service provider to verify that the sender sent a communication to the recipient; and upon verifying that the sender has sent the communication to the recipient, using user registration information at the service provider to determine whether the sender is a primary user.

4. A method for processing service requests at a service provider in a system in which users communicate by sending and receiving encrypted messages over a communications network, comprising:

at a sender, creating an encrypted message with sender-recipient mapping information and sending the encrypted message with sender-recipient mapping information to a recipient over the communications network, wherein creating the encrypted message comprises encrypting a message with a public key associated with the recipient to create the encrypted message;

at the recipient, receiving the encrypted message and sender-recipient mapping information;

at the recipient, submitting a service request to the service provider, wherein the service request includes the sender-recipient mapping information;

at the service provider, using the sender-recipient mapping information to determine whether the sender is a primary user in an organization that is a direct customer of the service provider and, if the sender is a primary user, satisfying the service request of the recipient, wherein the sender has an email address and the recipient has an email address, and wherein submitting the service request to the service provider comprises submitting the sender-recipient mapping information, the sender email address, and the recipient address to the service provider;

at the service provider, using the recipient email address from the service request to determine whether the recipient is a primary user; and when it has been determined that the recipient is not a primary user, verifying the sender-recipient mapping information before using the sender-recipient mapping information to determine whether the sender is a primary user.

5. A method for processing service requests at a service provider in a system in which users communicate by sending and receiving encrypted messages over a communications network, comprising:

at a sender, creating an encrypted message with sender-recipient mapping information and sending the encrypted message with sender-recipient mapping information to a recipient over the communications network, wherein creating the encrypted message comprises encrypting a message with a public key associated with the recipient to create the encrypted message;

at the recipient, receiving the encrypted message and sender-recipient mapping information;

at the recipient, submitting a service request to the service provider, wherein the service request includes the sender-recipient mapping information;

at the service provider, using the sender-recipient mapping information to determine whether the sender is a primary user in an organization that is a direct customer of the service provider and, if the sender is a primary user, satisfying the service request of the recipient, wherein the sender has an email address and the recipient has an email address, and wherein submitting the service request to the service provider comprises submitting the sender-recipient mapping information, the sender email address, and the recipient address to the service provider;

at the service provider, using the recipient email address to determine whether the recipient is a primary user;

when it has been determined that the recipient is not a primary user, verifying the sender-recipient mapping information before using the sender-recipient mapping information to determine whether the sender is a primary user; and upon determining that the sender is not a primary user using the sender-recipient mapping information, providing an opportunity for the recipient to register with the service provider as a tertiary user.

6. A method for processing service requests at a service provider in a system in which users communicate by sending and receiving encrypted messages over a communications network, comprising:

at a sender, creating an encrypted message with sender-recipient mapping information and sending the encrypted message with sender-recipient mapping information to a recipient over the communications network, wherein creating the encrypted message comprises encrypting a message with a public key associated with the recipient to create the encrypted message;

at the recipient, receiving the encrypted message and sender-recipient mapping information;

at the recipient, submitting a service request to the service provider, wherein the service request includes the sender-recipient mapping information;

at the service provider, using the sender-recipient mapping information to determine whether the sender is a primary user in an organization that is a direct customer of the service provider and, if the sender is a primary user, satisfying the service request of the recipient, wherein the sender has an email address and the recipient has an email address, and wherein submitting the service request to the service provider comprises submitting the sender-recipient mapping information, the sender email address, and the recipient address to the service provider provider;

at the service provider, using the recipient email address to determine whether the recipient is a primary user;

when it has been determined that the recipient is not a primary user, verifying the sender-recipient mapping information before using the sender-recipient mapping information to determine whether the sender is a primary user; and after determining that the sender is a primary user using the sender-recipient mapping information, entering the recipient as a secondary user in a user status list at the service provider, wherein after the recipient has been entered in the user status list, the user status list contains an entry for the sender that contains a customer identifier that identifies a given primary organization associated with the sender and contains an entry for the recipient that contains the same customer identifier.

* * * * *